US006960660B2

(12) United States Patent
Niinobe et al.

(10) Patent No.: US 6,960,660 B2
(45) Date of Patent: Nov. 1, 2005

(54) WATER-SOLUBLE CELLULOSE ETHER HAVING IMPROVED FILTERING CHARACTERISTICS AND SELECTION METHOD

(75) Inventors: Shingo Niinobe, Niigata-ken (JP); Kazuhisa Hayakawa, Niigata-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/464,550

(22) Filed: Jun. 19, 2003

(65) Prior Publication Data

US 2003/0236398 A1 Dec. 25, 2003

(30) Foreign Application Priority Data

Jun. 21, 2002 (JP) ............................ 2002-180849

(51) Int. Cl.[7] ........................ C08B 11/02; C08B 11/20; C08B 11/08

(52) U.S. Cl. ............................ 536/85; 536/56; 536/95; 536/99

(58) Field of Search ............................ 536/56, 85, 95, 536/99

(56) References Cited

U.S. PATENT DOCUMENTS 4,491,661 A * 1/1985 Bredereck et al. ............ 536/84
4,954,268 A 9/1990 Just et al.

FOREIGN PATENT DOCUMENTS

| | | | |
|---|---|---|---|
| EP | 0 081 406 | A1 | 6/1983 |
| GB | 427386 | A | 4/1935 |
| JP | 53-145893 | A | 12/1978 |
| JP | 1-217001 | A | 8/1989 |
| JP | 5-345801 | A | 12/1993 |
| JP | 62-56171 | A | 9/1994 |

OTHER PUBLICATIONS

Kjoniksen, Anna-Lena et al., Macromolecules; vol. 33, pp. 877-886 (Jan. 13, 2000).
Cellulose Society Ed., "Encyclopedia of Cellulose," 2000, Asakura Publishing Co., Ltd.

* cited by examiner

*Primary Examiner*—James O. Wilson
*Assistant Examiner*—Ganapathy Krishnan
(74) *Attorney, Agent, or Firm*—Birch, Stewart, Kolasch & Birch, LLP

(57) ABSTRACT

A water-soluble cellulose ether is selected by judging whether the number of undissolved fibers having a size of 16–200 μm is up to 350 fibers/2 ml in a 0.1 wt % aqueous solution of the cellulose ether at 25° C. This water-soluble cellulose ether forms an aqueous solution which can be filtered without clogging and can form a very thin film without defectives.

6 Claims, No Drawings

WATER-SOLUBLE CELLULOSE ETHER HAVING IMPROVED FILTERING CHARACTERISTICS AND SELECTION METHOD

This invention relates to a water-soluble cellulose ether having improved filtering characteristics and a method for selecting the same.

BACKGROUND OF THE INVENTION

Water-soluble cellulose ether is obtained by treating a cellulose having crystalline and amorphous moieties within the molecule with an etherifying reagent for converting the crystalline moieties to an amorphous state whereby the cellulose is made water soluble. It is acknowledged that the crystallinity of cellulose is largely ascribed to hydrogen bonds between hydroxyl groups within the molecule which develop on the skeleton structure of cellulose molecule (see Cellulose Society Ed., "Encyclopedia of Cellulose," 2000, Asakura Publishing Co., Ltd.). Cellulose is water insoluble because the hydrogen bonds are strong enough to prevent hydration with water molecules in water. In the preparation of cellulose ether, cellulose is treated with an alkaline aqueous solution such as NaOH to convert to alkali cellulose for disrupting crystallinity, then reacted with an etherifying reagent to substitute the etherifying reagent for hydroxyl groups on the cellulose to form a cellulose ether. Since crystallinity has not completely disappeared in the alkali cellulose, it is industrially difficult to increase the degree of ether substitution to substitute for all hydroxyl groups on the cellulose. For this reason, commercially available cellulose ethers are water-soluble, but partially contain water-insoluble portions. Some water-insoluble portions have a scale in excess of 1,000 μm corresponding to pulp fibers as the source of cellulose.

Since water-soluble cellulose ethers create a thickened state when dissolved in water, they are often used as a thickener for clear shampoo/rinses, hair conditioners, eye drops, contact lens cleaners and the like. For example, methylcellulose and hydroxypropylcellulose, which are typical of the water-soluble cellulose ethers, exhibit surface activity owing to the inclusion of hydrophilic or hydrophobic groups within the molecule, and are used as a suspension stabilizer in suspension polymerization of vinyl chloride or vinylidene chloride, and also as a starting material to household clear wrapping film. In these applications, products are desired to be clear. Then, unless an aqueous solution of cellulose ether is in a clear state by virtue of molecular level dissolution, products will contain defective portions, leading to deficient transparency or poor function. To solve this problem, an aqueous solution of cellulose ether is filtered to remove those portions which have not been dissolved on the molecular level, prior to use. If filtration is done using a filter having an opening which is finer than necessity, the filter is frequently clogged, which obstructs the industrial manufacture.

Meanwhile, soap bubbles are often utilized as child toys, attraction events on performance stages or the like and scientific education tools because of their surface activity. To produce unbreakable bubbles, a cellulose ether may be dissolved in a bubble-forming soap solution. If the cellulose ether contains a minor amount of water-insoluble portions, these insoluble portions become defects during bubble film inflation, so that the bubble film fails. It is then difficult to blow unbreakable bubbles.

SUMMARY OF THE INVENTION

An object of the present invention is to provide a cellulose ether which contains minimal water-insoluble portions, and whose aqueous solution can be filtered without clogging and can form bubbles that are unbreakable upon contact with the hand. Another object is to provide a method of selecting the cellulose ether.

It has been found that a cellulose ether can be used as a thickener for clear shampoo/rinses, hair conditioners, eye drops, contact lens cleaners and the like if the content of water-insoluble portions which become problematic on practical use is below a certain level; that when an aqueous solution of this cellulose ether is filtered through a filter having an opening of less than 63 μm prior to use, the filter is not frequently clogged; that a desired clear solution is easily prepared from this cellulose ether; and that this cellulose ether is advantageously used in a bubble-forming composition for forming bubbles which are unbreakable upon contact with the hand.

In a first aspect, the invention provides a water-soluble cellulose ether characterized in that the number of undissolved fibers having a size of 16 to 200 μm in a 0.1 wt % aqueous solution at 25° C. is up to 350 fibers/2 ml.

Preferably, when 100 g of the cellulose ether is shaken on a sieve having an opening of 150 μm, a powder oversize fraction is up to 25% by weight.

The cellulose ether is typically an alkylcellulose, hydroxyalkylcellulose or hydroxyalkylalkylcellulose.

A water-soluble cellulose ether suitable for use in bubble-forming compositions is obtained by filtering the water-soluble cellulose ether defined above or an aqueous solution thereof through a filter having an opening of less than 63 μm.

In a second aspect, the invention provides a method of selecting a water-soluble cellulose ether. A water-soluble cellulose ether whose number of undissolved fibers having a size of 16 to 200 μm in a 0.1 wt % aqueous solution at 25° C. is up to 350 fibers/2 ml is selected as a water-soluble cellulose ether which can form an aqueous solution that causes minimized clogging to a JIS metal mesh having an opening of less than 63 μm. Preferably, the selected water-soluble cellulose ether further satisfies that when 100 g of the cellulose ether is shaken on a sieve having an opening of 150 μm, a powder oversize fraction is up to 25% by weight.

DESCRIPTION OF THE PREFERRED EMBODIMENTS

The cellulose ethers of the invention include alkylcelluloses such as methylcellulose (MC), hydroxyalkylcelluloses such as hydroxypropylcellulose (HPC) and hydroxyethylcellulose (HEC), hydroxyalkylalkylcelluloses such as hydroxypropylmethylcellulose (HPMC), hydroxyethylmethylcellulose (HEMC) and hydroxyethylethylcellulose (HEEC), and sodium carboxymethylcellulose (CMC-Na), which are water soluble.

As described in JP-A 5-345801 and JP-A 1-217001, these cellulose ethers are prepared by mixing cellulose with NaOH or the like to form a homogeneous alkali cellulose, reacting it with an etherifying reagent uniformly to a degree of ether substitution necessary to become water soluble.

Referring to the degree of substitution of the cellulose ether, examples of the hydroxyalkylcellulose include a hydroxypropylcellulose containing 50 to 70% by weight of hydroxypropoxyl groups and a hydroxyethylcellulose containing 30 to 60% by weight of hydroxyethoxyl groups; and examples of the hydroxyalkylalkylcellulose include a hydroxypropylmethylcellulose containing 19 to 30% by weight of methoxyl groups and 4 to 20% by weight of hydroxypropoxyl groups, a hydroxyethylmethylcellulose containing 19 to 30% by weight of methoxyl groups and 9 to 20% by weight of hydroxyethoxyl groups, and a hydroxyethylethylcellulose containing 11 to 21% by weight of ethoxyl groups and 40 to 57% by weight of hydroxyethoxyl groups.

A cellulose ether which is short in degree of substitution or non-uniform in substitution is undesirable in that when it is dissolved in water, a number of fibrous constituents having a size of about 16 to 200 μm are left undissolved.

The number of undissolved fibers can be determined by dissolving a cellulose ether in an aqueous electrolyte solution ISOTON II for Coulter counter (by Coulter Co.) so as to form a 0.1 wt % aqueous solution in a thermostat tank at 25° C. and counting the number of undissolved fibers having a size of 16 to 200 μm per 2 ml of the solution using an aperture tube having a diameter of 400 μm and a Coulter counter model TA II by Coulter Co. or a multi-sizer. An aqueous solution in which the number of undissolved fibers thus determined is up to 350 fibers per 2 ml allows for efficient filtering. If the concentration of cellulose ether cannot be measured because of excess dilution, it is possible to measure the number of undissolved fibers in an appropriate high concentration solution and convert it to a 0.1 wt % concentration value.

The molecular weight of the water-soluble cellulose ether is not critical. Preferably the water-soluble cellulose ether has a weight average molecular weight of at least 10,000, which corresponds to a 2 wt % aqueous solution having a viscosity of at least 3 mPa·s at 20° C.

The cellulose ether of the invention can be used in the form of an aqueous solution. Although the viscosity in use of the cellulose ether aqueous solution varies depending on the molecular weight of a particular cellulose ether, the concentration in use is generally in the range of 10 to 30% by weight.

For better dissolution, the cellulose ether should preferably pass the following test. That is, 100 g of a cellulose ether powder is placed on a standard sieve No. 100 (having an opening of 150 μm) according to JIS Z8801. The sieve is shaken for 30 minutes by a rotating/tapping sieve shaker (Ro-Tap shaker model 429 by Kansai Kanaami K.K.) under conditions: a shaking frequency of 200 shakes/min, a tapping frequency of 156 taps/min and a shaking amplitude of 50 mm. The powder remainder on the sieve (i.e., oversize) is up to 25% by weight.

The cellulose ether of the invention is advantageously used as a water-soluble cellulose ether in a bubble-forming composition. The concentration of the water-soluble cellulose ether in the bubble-forming composition should be appropriate enough for a bubble to form and dry in flying afloat. It should be avoided that the composition is very thick and has a viscosity high enough to obstruct bubble formation. An appropriate concentration varies with the molecular weight of a particular water-soluble cellulose ether used and does not always fall in a certain range. Preferably the concentration is in a range of 10 to 30% by weight, especially 15 to 25% by weight.

An aqueous solution of the cellulose ether of the invention which is used as a bubble-forming composition is preferably filtered prior to use. Any filter may be used in filtration of the cellulose ether solution as long as it is commercially available and it has an opening capable of removing those particles having a size of more than 60 μm which become problematic on use. Preferred is a filter having an opening of up to 63 μm, especially 32 to 63 μm according to the JIS industrial sieve opening standard.

When the water-soluble cellulose ether is used in a bubble-forming composition, a surfactant may be added to the composition. Any surfactant may be used as long as it, when dissolved or dispersed in water, reduces the surface tension below the surface tension of water alone. A choice may be made among anionic, nonionic, cationic and ampholytic surfactants.

Examples include anionic surfactants such as metal salts and ammonium salts of dodecylbenzenesulfonic acid, alkyl ether sulfonic acids, and carboxylic acids such as (meth) acrylic acid derivatives; nonionic surfactants such as polyalkylene glycol derivatives, sorbitan derivatives, fluoride group-bearing surfactants, and silicone base surfactants; cationic surfactants such as dodecyltrimethylammonium chloride; and ampholytic surfactants such as betaine surfactants.

For choice of a surfactant, the surfactant which forms with the water-soluble cellulose ether an aqueous solution which is ready to bubble blowing is desirable. Preferred exemplary combinations are combinations of a water-soluble cellulose ether with one or more of perfluorooctanesulfonic acid surfactants (e.g., perfluorooctanesulfonic acid, metal salts of perfluorooctanesulfonic acid, and ammonium salt of perfluorooctanesulfonic acid), alkylsulfonic acid surfactants (e.g., metal salts of alkylsulfonic acids, ammonium salts of alkylsulfonic acids, triethanolamine salts of alkylsulfonic acids), metal salts of polyoxyethylene alkyl ether sulfonic acids, ammonium salts of alkyl ether sulfonic acids, and triethanolamine salts of polyoxyethylene alkyl ether sulfonic acids.

The perfluorooctanesulfonic acid, and metal and ammonium salts of perfluorooctanesulfonic acid used herein may be perfluorooctanesulfonic acid EF-101 commercially available from Tokem Products Co., Ltd. and sodium, potassium and ammonium salts thereof. Of the alkylsulfonic acid surfactants such as metal salts, ammonium salts and triethanolamine salts of alkylsulfonic acids, and the metal salts, ammonium salts and triethanolamine salts of alkyl ether sulfonic acids, those bearing alkyl groups of about 8 to 18 carbon atoms have an appropriate surface activity to form a bubble in good shape. They are commercially available under the trade name of Persoft series from NOF Corp., which are surfactants containing sodium laurylsulfonate, sodium polyoxyethylene lauryl ether sulfonate, triethanolamine of laurylsulfonic acid, and triethanolamine of polyoxyethylene lauryl ether sulfonic acid.

These surfactants are used at any concentration in the bubble-forming composition as long as bubbles can be formed. Usually the concentration of the surfactant is 0.5 to 10% by weight, preferably 0.5 to 3% by weight. Specifically the concentration of perfluorooctanesulfonic acid surfactant is preferably 0.6 to 2.5% by weight, more preferably 0.8 to 2.0% by weight, and the concentration of alkylsulfonic acid surfactant is preferably 2 to 8% by weight, more preferably 2 to 5% by weight. It is also recommended to use a perfluorooctanesulfonic acid surfactant in combination with an alkylsulfonic acid surfactant.

To the bubble-forming composition, there may be further added colorants such as food red, Methyl Orange, and Methyl Red, plasticizers such as glycerin and other polyhydric alcohols, other surfactants, and water-soluble polymers such as polyvinyl alcohol, poly(sodium acrylate) and polyacrylamide.

EXAMPLE

Examples of the invention are given below by way of illustration, but the invention is not limited thereto.

Example 1

A hydroxypropylmethylcellulose lot available under the trade name 60SH-50 from Shin-Etsu Chemical Co., Ltd., containing 29 wt % of methoxyl groups and 9 wt % of hydroxypropoxyl groups and having a viscosity of 50 mPa·s as measured on a 2 wt % solution at 20° C., had the test results that when 100 g of the cellulose ether powder was placed on a standard sieve No. 100 (having an opening of 150 μm) according to JIS Z8801 and the sieve was shaken for 30 minutes by a rotating/tapping sieve shaker (Ro-Tap shaker model 429 by Kansai Kanaami K.K.) under conditions: a shaking frequency of 200 shakes/min, a tapping frequency of 156 taps/min and a shaking amplitude of 50 mm, the powder oversize fraction (i.e., the remainder on the sieve) was 10% by weight and that when a 0.1 wt % aqueous solution of the cellulose ether at 25° C. was prepared, the number of undissolved fibers having a size of 16 to 200 μm was 270 fibers/2 ml as measured by a Coulter counter. A 10 wt % aqueous solution of this hydroxypropylmethylcellulose was prepared and suction filtered through a 55-mm diameter JIS metal mesh having an opening of 63 μm. No decline in suction rate was observed after 50 liters of the aqueous solution was passed, and the filtration rate dropped 20% when 100 liters was exceeded.

Comparative Example 1

A hydroxypropylmethylcellulose lot available under the trade name 60SH-50 from Shin-Etsu Chemical Co., Ltd., containing 29 wt % of methoxyl groups and 9 wt % of hydroxypropoxyl groups and having a viscosity of 50 mPa·s as measured on a 2 wt % solution at 20° C., had the test results under the same conditions as in Example 1 that the powder oversize fraction was 10% by weight and that the number of undissolved fibers having a size of 16 to 200 μm was 900 fibers/2 ml of a 0.1 wt % aqueous solution as measured by a Coulter counter. A 10 wt % aqueous solution of this hydroxypropylmethylcellulose was prepared and suction filtered through a 55-mm diameter JIS metal mesh having an opening of 63 μm. The suction rate was reduced to ½ after 50 liters of the aqueous solution was passed, and the filtration rate dropped 90% when 100 liters was exceeded.

Example 2

A hydroxypropylmethylcellulose lot available under the trade name 60SH-3 from Shin-Etsu Chemical Co., Ltd., containing 29 wt % of methoxyl groups and 9 wt % of hydroxypropoxyl groups and having a viscosity of 3 mPa·s as measured on a 2 wt % solution at 20° C., had the test results under the same conditions as in Example 1 that the powder oversize fraction was 10% by weight and that the number of undissolved fibers having a size of 16 to 200 μm was 190 fibers/2 ml of a 0.1 wt % aqueous solution as measured by a Coulter counter. A 20 wt % aqueous solution of this hydroxypropylmethylcellulose was prepared. 5 g of Persoft SFT (NOF Corp.) and 0.8 g of Eftop EF101 (Tokem Products Co., Ltd.) were added to and dissolved in 50 g of the aqueous solution to form a bubble-forming composition.

A wire tool of 0.1 mm wire diameter having a ring with a diameter of 5 mm was furnished. Bubbles were formed by dipping the ring in the bubble-forming aqueous solution, taking it out of the solution so that a solution film extended on the ring, and blowing off the film. The bubbles fell to the ground from a height of 1.5 m. On observation, the bubbles remained unbroken over 24 hours.

Comparative Example 2

A hydroxypropylmethylcellulose lot available under the trade name 65SH-5 from Shin-Etsu Chemical Co., Ltd., containing 28 wt % of methoxyl groups and 7 wt % of hydroxypropoxyl groups and having a viscosity of 5 mPa·s as measured on a 2 wt % solution at 20° C., had the test results under the same conditions as in Example 2 that the powder oversize fraction was 10% by weight and that the number of undissolved fibers having a size of 16 to 200 μm was 390 fibers/2 ml of a 0.1 wt % aqueous solution as measured by a Coulter counter. A 20 wt % aqueous solution of this hydroxypropylmethylcellulose was prepared. 5 g of Persoft SFT (NOF Corp.) and 0.8 g of Eftop EF101 (Tokem Products Co., Ltd.) were added to and dissolved in 50 g of the aqueous solution to form a bubble-forming composition.

A wire tool of 0.1 mm wire diameter having a ring with a diameter of 5 mm was furnished. Bubbles were formed by dipping the ring in the bubble-forming aqueous solution, taking it out of the solution so that a solution film extended on the ring, and blowing off the film. The bubbles fell to the ground from a height of 1.5 m. The bubbles broke just on landing.

Example 3

A hydroxypropylmethylcellulose lot available under the trade name 60SH-3 from Shin-Etsu Chemical Co., Ltd., containing 29 wt % of methoxyl groups and 9 wt % of hydroxypropoxyl groups and having a viscosity of 3 mPa·s as measured on a 2 wt % solution at 20° C., had the test results under the same conditions as in Example 1 that the powder oversize fraction was 10% by weight and that the number of undissolved fibers having a size of 16 to 200 μm was 270 fibers/2 ml of a 0.1 wt % aqueous solution as measured by a Coulter counter. A 20 wt % aqueous solution of this hydroxypropylmethylcellulose was prepared and suction filtered through a 55-mm diameter JIS metal mesh having an opening of 63 μm. No decline in suction rate was observed after 50 liters of the aqueous solution was passed, and the filtration rate dropped 5% when 100 liters was exceeded. 5 g of Persoft SFT (NOF Corp.) and 0.8 g of Eftop EF101 (Tokem Products Co., Ltd.) were added to and dissolved in 50 g of the aqueous solution to form a bubble-forming composition.

A wire tool of 0.1 mm wire diameter having a ring with a diameter of 5 mm was furnished. Bubbles were formed by dipping the ring in the bubble-forming aqueous solution, taking it out of the solution so that a solution film extended on the ring, and blowing off the film. The bubbles fell to the ground from a height of 1.5 m. On observation, the bubbles remained unbroken over 24 hours.

There is selectively obtained a water-soluble cellulose ether that forms an aqueous solution which can be passed through a filter without clogging and can form a very thin film without defectives. Using the cellulose ether, unbreakable bubbles can be blown.

Japanese Patent Application No. 2002-180849 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

We claim:

1. A water-soluble cellulose ether characterized in that the number of undissolved fibers having a size of 16 to 200 μm in a 0.1 wt % aqueous solution at 25° C. is up to 350 fibers/2 ml, said water-soluble cellulose ether is selected from the group consisting of a hydroxypropylcellulose containing 50 to 70% by weight of hydroxypropoxyl groups, a hydroxyethylcellulose containing 30 to 60% by weight of hydroxyethoxyl groups, a hydroxypropylmethylcellulose containing 19 to 30% by weight of methoxyl groups and 4 to 20% by weight of hydroxypropoxyl groups, a hydroxyethylmethylcellulose containing 19 to 30% by weight of methoxyl groups and 9 to 20% by weight of hydroxyethoxyl groups, and a hydroxyethylethylcellulose containing 11 to 21% by weight of ethoxyl groups and 40 to 57% by weight of hydroxyethoxyl groups.

2. A cellulose ether according to claim 1 wherein when 100 g of the cellulose ether is shaken on a sieve having an opening of 150 μm. a powder oversize fraction is up to 25% by weight.

3. A water-soluble cellulose ether, which is a filtered product of an aqueous solution of the water-soluble cellulose ether of claim 1 through a filter having an opening of less than 63 μm.

4. A method of preparing a water-soluble cellulose ether comprising: mixing cellulose with alkali to form a homogeneous alkali cellulose, reacting the homogeneous alkali cellulose with an etherifying reagent uniformly to a degree of ether substitution necessary for the cellulose ether product to become water soluble;

wherein said water-soluble cellulose ether can form an aqueous solution that causes minimized clogging to a metal mesh sieve having an opening of less than 63 μm, and wherein said water-soluble cellulose ether has a number of undissolved fibers having a size of 16 to 200 μm in a 0.1 wt % aqueous solution at 25° C. is up to 350 fibers/2 ml, said water-soluble cellulose ether is selected from the group consisting of a hydroxypropylcellulose containing 50 to 70% by weight of hydroxypropoxyl groups, a hydroxyethylcellulose containing 30 to 60% by weight of hydroxyethoxyl groups, a hydroxypropylmethylcellulose containing 19 to 30% by weight of methoxyl groups and 4 to 20% by weight of hydroxypropoxyl groups, a hydroxyethylmethylcellulose containing 19 to 30% by weight of methoxyl groups and 9 to 20% by weight of hydroxyethoxyl groups, and a hydroxyethylethylcellulose containing 11 to 21% by weight of ethoxyl groups and 40 to 57% by weight of hydroxyethoxyl groups.

5. A method of preparing a water-soluble cellulose ether according to claim 4 wherein the selected water-soluble cellulose ether further satisfies that when 100 g of the cellulose ether is shaken on a sieve having an opening of 150 μm, a powder oversize fraction is up to 25% by weight.

6. A method of preparing a water-soluble cellulose ether composition comprising: mixing a water-soluble cellulose ether which can form an aqueous solution that causes minimized clogging to a metal mesh sieve having an opening of less than 63 μm with water, and wherein said water-soluble cellulose ether has a number of undissolved fibers having a size of 16 to 200 μm in a 0.1 wt % aqueous solution at 25° C. up to 350 fibers/2 ml, said water-soluble cellulose ether is selected from the group consisting of a hydroxypropylcellulose containing 50 to 70% by weight of hydroxypropoxyl groups, a hydroxyethylcellulose containing 30 to 60% by weight of hydroxyethoxyl groups, a hydroxypropylmethylcellulose containing 19 to 30% by weight of methoxyl groups and 4 to 20% by weight of hydroxypropoxyl groups, a hydroxyethylmethylcellulose containing 19 to 30% by weight of methoxyl groups and 9 to 20% by weight of hydroxyethoxyl groups, and a hydroxyethylethylcellulose containing 11 to 21% by weight of ethoxyl groups and 40 to 57% by weight of hydroxyethoxyl groups.

* * * * *